United States Patent
Nakatani

(10) Patent No.: US 6,739,559 B2
(45) Date of Patent: May 25, 2004

(54) PANHEAD

(75) Inventor: Koichiro Nakatani, Shinuku-Ku (JP)

(73) Assignee: Nihon Velbon Seiki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/411,420

(22) Filed: Apr. 10, 2003

(65) Prior Publication Data

US 2004/0061035 A1 Apr. 1, 2004

(30) Foreign Application Priority Data

Oct. 1, 2002 (JP) ........................................ 2002-288291

(51) Int. Cl.$^7$ ................................................ F16M 11/04
(52) U.S. Cl. ................................ 248/187.1; 248/278.1; 396/419; 396/428
(58) Field of Search .......................... 248/177.1, 178.1, 248/187.1, 289.11, 279.1, 291.1, 278.1; 396/419, 428; 352/243

(56) References Cited

U.S. PATENT DOCUMENTS

| | | | | | |
|---|---|---|---|---|---|
| 2,469,063 | A | * | 5/1949 | Bliss | 248/183.2 |
| 3,128,982 | A | * | 4/1964 | Christopher | 248/183.2 |
| 4,249,817 | A | * | 2/1981 | Blau | 396/428 |
| 5,170,197 | A | * | 12/1992 | Schmidt et al. | 396/428 |
| 5,365,293 | A | * | 11/1994 | Nakatani | 396/428 |
| 5,538,212 | A | * | 7/1996 | Kennedy | 248/215 |
| 5,604,551 | A | * | 2/1997 | Choi et al. | 396/58 |
| 6,116,554 | A | * | 9/2000 | Wei | 248/183.1 |
| 6,244,759 | B1 | * | 6/2001 | Russo | 396/428 |
| 6,644,871 | B2 | * | 11/2003 | Nakatani | 396/428 |
| 2002/0090216 | A1 | * | 7/2002 | Melitopoulos | 396/428 |
| 2002/0179787 | A1 | * | 12/2002 | Nakatani | 248/187.1 |
| 2003/0012571 | A1 | * | 1/2003 | Nakatani | 396/428 |

FOREIGN PATENT DOCUMENTS

JP          64-6598          1/1989

OTHER PUBLICATIONS

Patent Abstracts of Japan for JP 64–006598 published on Jan. 11, 1989.

* cited by examiner

Primary Examiner—Leslie A. Braun
Assistant Examiner—Amy J. Sterling
(74) Attorney, Agent, or Firm—Darby & Darby

(57) ABSTRACT

To provide a panhead in which operationality is excellent and an appropriate tilt fixing force can be obtained. A panhead comprises a pan rotation body which has a fixing notch portion and rotates in the left and right direction around a vertical axis. The panhead comprises a tilt rotation body which has a fixing notch portion and rotates in the up-and-down direction around a horizontal axis. The panhead comprises an attaching-object support body to which an attaching object can be attached and an operation body which is provided on the tilt rotation body so as to be capable of rotating operation. By a one-action rotating operation of the operation body, the tilt rotation body and the pan rotation body are respectively fixed. The front-end portion of the fixing notch portion of the pan rotation body is blocked by a blocking portion for deformation suppression.

6 Claims, 4 Drawing Sheets

PANHEAD

BACKGROUND OF THE INVENTION

The present invention relates to a panhead in which operationality is excellent and an appropriate tilt fixing force can be obtained.

Priorly, for example, a panhead which comprises: a pan rotation body which rotates in the left and right direction around a vertical axis, a tilt rotation body which rotates in the up-and-down direction around a horizontal axis, and in which: an attaching-object support body to which an attaching object (for example, a camera) is attached, wherein the pan rotation body is fixed by a rotating operation of the pan fixing operation body, and the tilt rotation body is fixed by a rotating operation of the tilt fixing operation body has been known (see Patent Document 1, for example).

Patent Document 1: Japanese Patent Publication No. Hei-2-8193 (Page 2, FIG. 3)

However, in the above prior-art panhead, since the two operation bodies must be operated to rotate when the tilt rotation body and the pan rotation body are fixed, operationality may not be excellent.

Therefore, it can be considered to form a fixing notch portion in each of the pan rotation body and tilt rotation body so that a fixation of the tilt rotation body and pan rotation body can be carried out by a rotating operation of one operation body.

However, in such a panhead, since the front end of the fixing notch portion of the pan rotation body is opened, the width dimension of the fixing notch portion of the pan rotation body is excessively reduced when the tilt rotation body and the pan rotation body are fixed, therefore, an appropriate tilt fixing force may not be obtainable.

OBJECTS AND SUMMARY OF THE INVENTION

In order to solve the problem, an object of the present invention is to provide a panhead in which operationality is excellent and an appropriate tilt fixing force can be obtained.

A panhead of the present invention comprises: a pan rotation body in which a fixing notch portion is formed and which rotates in the left and right direction around a vertical axis; a tilt rotation body which is provided on this pan rotation body, in which a fixing notch portion is formed, and which rotates in the up-and-down direction around a horizontal axis; an attaching-object support body which is provided on this tilt rotation body and to which an attaching object is attached; and an operation body which is provided so as to be rotatable on the tilt rotation body, and is constructed such that: by a rotating operation of the operation body, the tilt rotation body and the pan rotation body are respectively elastically deformed, the width dimension of the fixing notch portion of the tilt rotation body and the width dimension of the fixing notch portion of the pan rotation body are respectively reduced, and said tilt rotation body and the pan rotation body are respectively fixed, wherein the front end of the fixing notch portion of the pan rotation body is blocked by a blocking portion for deformation suppression.

Thus, since the tilt rotation body and the pan rotation body can be separately fixed by a rotating operation of the operation body, operationality is excellent, and since the front end of the fixing notch portion of the pan rotation body is blocked by the blocking portion for deformation suppression, the width dimension of the fixing notch portion of the pan rotation body is not excessively reduced when the tilt operation body and the pan rotation body are fixed, thus an appropriate tilt fixing force can be obtained.

A panhead of the invention is constructed such that, in the panhead,
the blocking portion is provided in a main-body portion of the pan rotation body as one body.

Thus, since the blocking portion is formed in the main-body portion of the pan rotation body as one body, compared to the case where the blocking portion and main-body portion are provided as separate bodies, the number of components can be reduced and assembling work becomes easy.

DETAILED DESCRIPTION OF THE INVENTION

Hereinafter, an embodiment of a panhead of the present invention will be described in detail with reference to the drawings.

Figure 1:
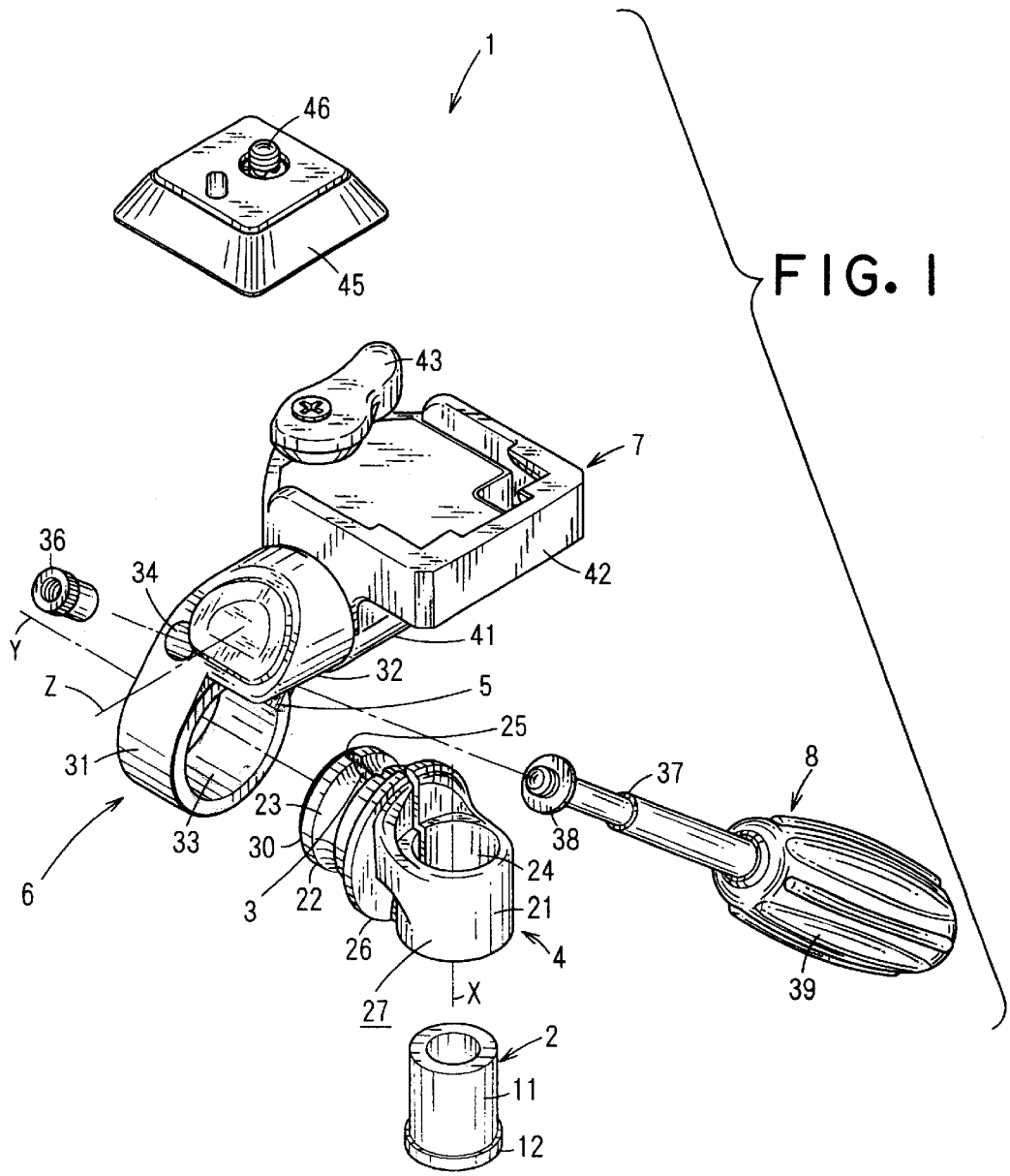
FIG. 1 is an exploded perspective view showing an embodiment of the panhead of the present invention.

In FIG. 1, 1 denotes a panhead, and this panhead 1 comprises, for example, a base body 2 to be detachably attached to the upper-end portion of legs of a tripod or the like (unillustrated) and a pan rotation body 4 which is provided on this base body 2, in which a fixing notch portion (a slot portion) 3 is formed, and which rotates in the left and right direction around a vertical axis X.

Moreover, this panhead 1 comprises a tilt rotation body 6 which is provided on the right-side portion as a one-side portion of the pan rotation body 4, in which a fixing notch portion (a slot portion) 5 is formed, and which rotates in the up-and-down direction around a horizontal axis Y in the left and right direction and an attaching-object support body (a side tilt supporting base or the line) 7 which is provided on the upper portion of this tilt rotation body 6 and to which an attaching object (unillustrated) such as a camera is detachably attached. This attaching-object support body 7 is up-and-down rotatable and adjustable around a horizontal axis Z in the back and forth direction.

Furthermore, this panhead 1 comprises one approximately lever-like operation body (an operating handle or the like) 8 which is provided so as to be rotatable on the tilt rotation body 6.

Figure 2:
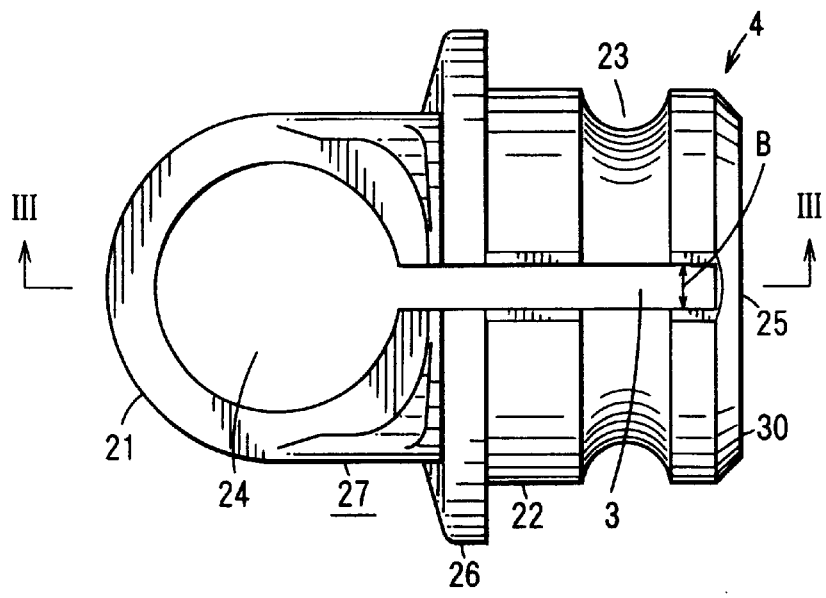
FIG. 2 is a plan view of the pan rotation body of the same panhead as the above.
Figure 5:
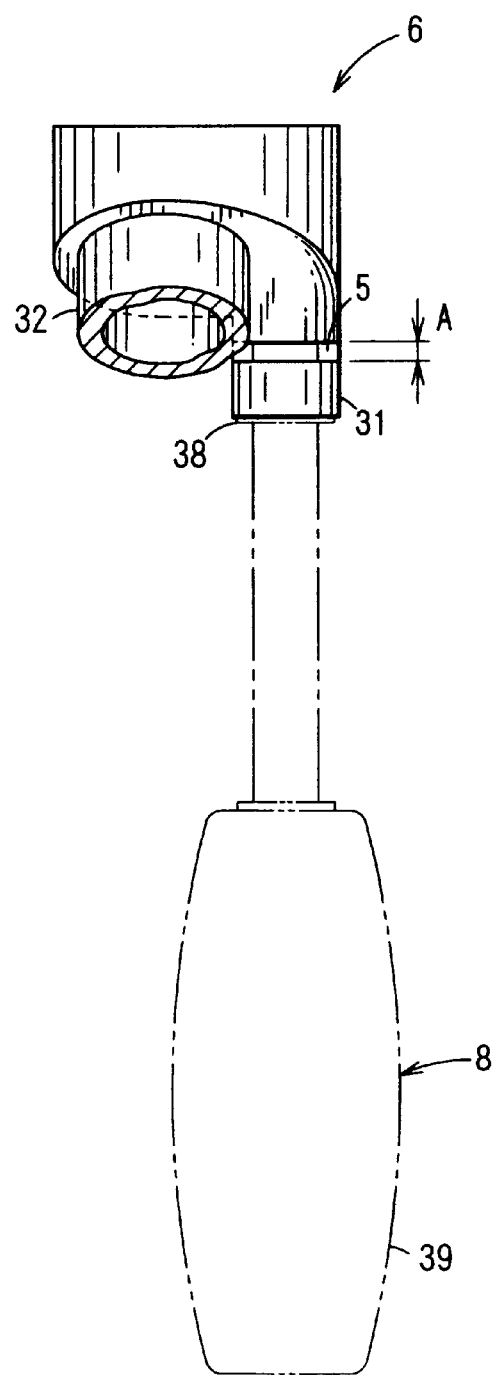
FIG. 5 is a partially omitted plan view of the tilt rotation body of the same panhead as the above.

Then, by a rotating operation of this single operation body 8 in one direction (for example, clockwise), the tilt rotation body 6 and the pan rotation body 4 are respectively slightly elastically deformed and a width dimension A of the fixing notch portion 5 of the tilt rotation body 6 and a width dimension B of the fixing notch portion 3 of the pan rotation body 4 are respectively reduced, whereby the tilt rotation body 6 and the pan rotation body 4 are respectively fixed (see FIG. 2 and FIG. 5). Namely, the pan rotation body 4 is press-fitted and fixed to the base body 2, and the tilt rotation body 6 is press-fitted and fixed to the pan rotation body 4.

In addition, by a rotating operation of this single operation body 8 in the other direction (for example, counterclockwise), the tilt rotation body 6 and the pan rotation body 4 are respectively restored and the width dimension A of the fixing notch portion 5 of the tilt rotation body 6 and the width dimension B of the fixing notch portion 3 of the pan rotation body 4 are respectively returned to their original dimensions, whereby a fixation of the tilt rotation body 6 to the pan rotation body 4 and a fixation of the pan rotation body 4 to the base body 2 are released.

Herein, the base body 2 has an approximately cylindrical vertical support-shaft portion 11 having an approximately round-shaft shape to be screwed to a screw portion on the upper end portion of legs of a tripod (unillustrated), and on the lower-end portion of this vertical support-shaft portion 11, a large-diameter portion 12 for positioning is provided as one body.

Figure 3:
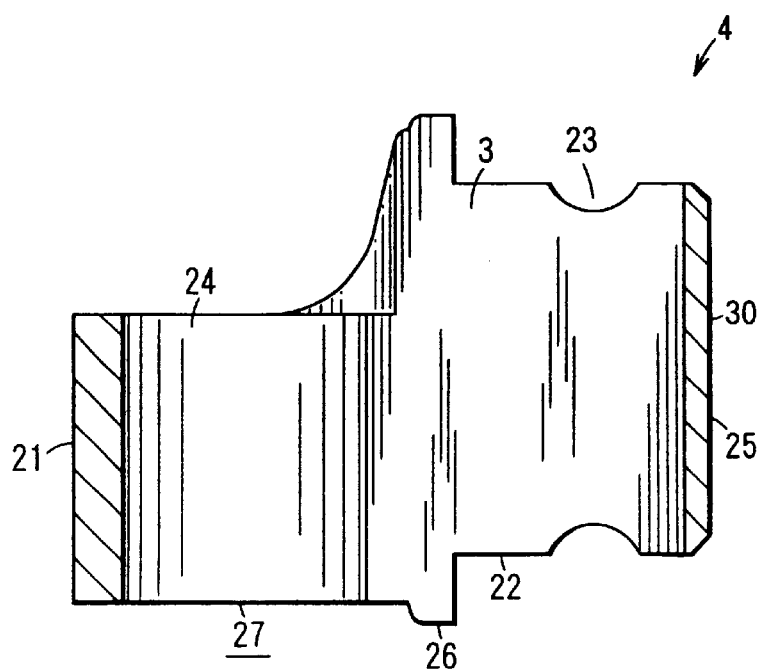
FIG. 3 is a sectional view along III—III of the pan rotation body of the same panhead as the above.

In addition, the pan rotation body 4 is, as shown in FIG. 1 through FIG. 3, formed of, for example, a synthetic resin or the like as one body.

This pan rotation body 4 has an approximately cylindrical fitting pipe portion 21 which is fitted to the outer circumferential side of the vertical support-shaft portion 11 of the base portion 2 so as to be rotatable in the left and right direction.

From the right-side portion as one-side portion of this fitting pipe portion 21, an approximately columnar horizontal support-shaft portion 22 having an approximately round-shaft shape is protruded toward the right side as one body.

On the outer circumferential surface of this horizontal support-shaft portion 22, a groove 23 in the circumferential direction whose section has an approximately semicircle shape is formed. In addition, in this horizontal support-shaft portion 22, the fixing notch portion 3 to split this horizontal support-shaft portion 22 into two front and rear sections is formed along a vertical surface which passes through a shaft center of the horizontal support-shaft portion 22.

Then, the base end (left end) of this fixing notch portion 3 is opened toward an internal space 24 of the fitting pipe portion 21 and is faced onto this internal space 24 of the fitting pipe portion 21. In addition, the front end (right end) of this fixing notch potion 3 is blocked by a deformation-suppressing blocking portion 25 for suppressing elastic deformation of the front-end side of the horizontal support-shaft portion 22 of the pan rotation body 4, and by this approximately plate-like blocking portion 25 which is long in the up-and-down direction, the width dimension B of the front-end side of the fixing notch portion 3 of the pan rotation body 4 is prevented from being excessively reduced.

In addition, on the base-end portion of this horizontal support-shaft portion 22, a large-diameter portion 26 for positioning is provided as one body.

Herein, the fitting pipe portion 21, the horizontal support-shaft portion 22, and the large-diameter portion 26 compose a main-body portion 27 of the pan rotation body 4. The blocking portion 25 which blocks the front end of the fixing notch portion 3 of the pan rotation body 4 is provided on this main-body portion 27 as one body. Namely, the blocking portion 25 of the pan rotation body 4 is provided on the front-end portion of the horizontal support-shaft portion 22 of the main-body portion 27 along the up-and-down direction as one body, and this front-end portion of the horizontal support-shaft portion 22 and the blocking portion 25 compose an approximately circular plate-like, non-deformable circular portion 30.

Figure 4:
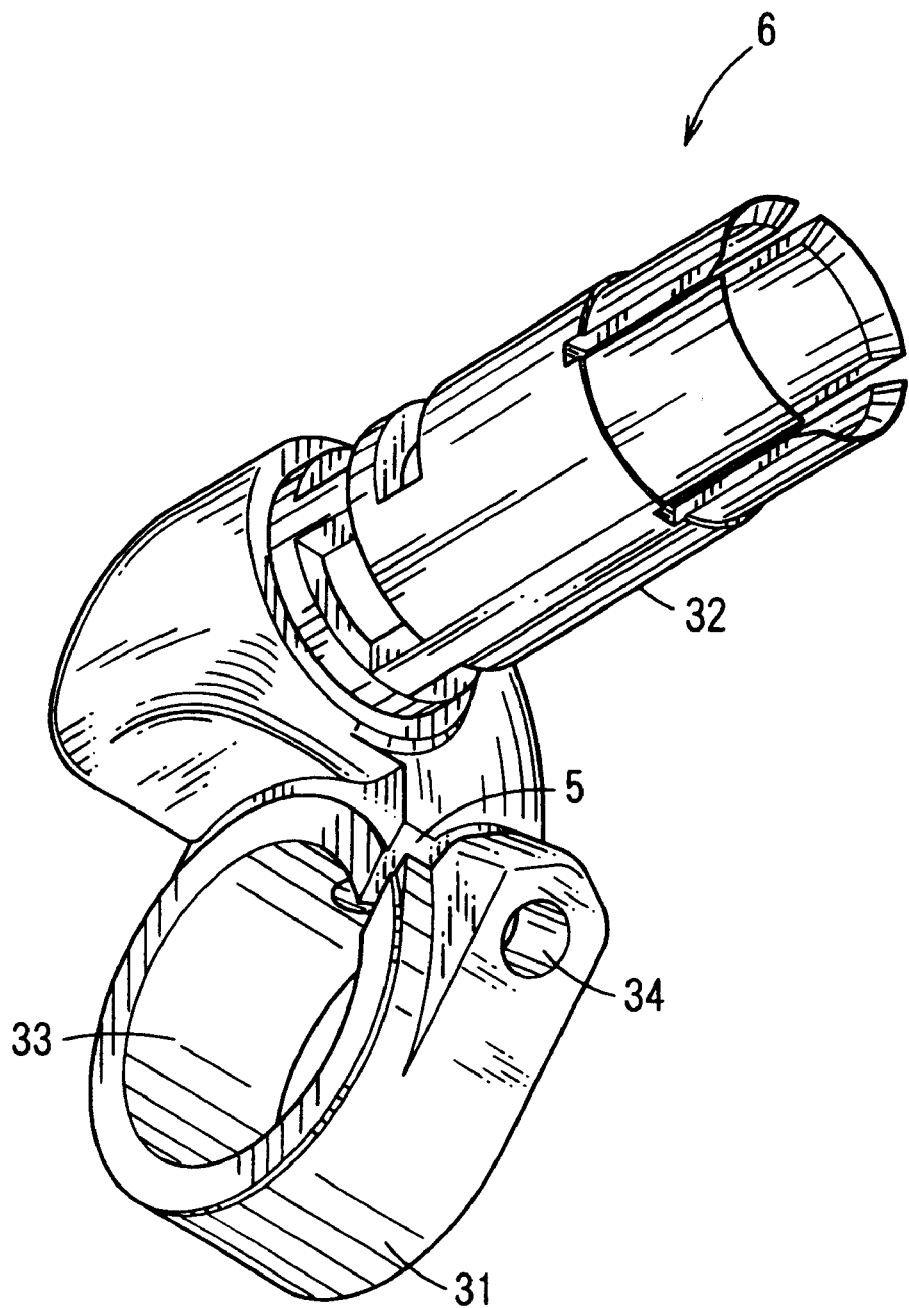
FIG. 4 is a perspective view of the tilt rotation body of the same panhead as the above.

In addition, as shown in FIG. 1, FIG. 4, and FIG. 5, the tilt rotation body 6 is formed of, for example, a synthetic resin or the like as one body.

This tilt rotation body 6 has an approximately cylindrical fitting pipe portion 31 which is fitted to the outer peripheral side of the horizontal support-shaft portion 22 of the pan rotation body 4 so as to be rotatable in the up-and-down direction. From the upper portion of this fitting pipe portion 31, an approximately cylindrical support-shaft portion 32 having an approximately round-shaft shape is protruded toward the rear as one body.

In addition, on the upper rear side of this fitting pipe portion 31, the fixing notch portion 5 is formed. The lower end of this fixing notch portion 5 is opened toward an inner space 33 of the fitting pipe portion 31 and is faced onto this inner space 33 of the fitting pipe portion 31. In addition, the upper end of this fixing notch portion 5 is opened upward.

Furthermore, on the upper portion of this fitting pipe portion 31, a through hole 34 in the back-and-forth direction linked with the up-and-down opened fixing notch portion 5 is formed. And, to the front-end side of this through hole 34, a nut 36 is fitted and securely fitted. To this nut 36, the front-end side of the operation body 8 which has been inserted from the rear into the through hole 34 is screwed. Herein, a part of this inserted operation body 8 part is located in the groove 23 of the horizontal support-shaft portion 22 of the pan rotation body 4.

In a case where a gripping portion 39 of the operation body 8 is gripped and this operation body 8 is operated to rotate by an appointed amount in one direction, a stepped portion 37 of this operation body 8 is pressed against the back surface of the fitting pipe portion 31 of the tilt rotation body 6 via a washer 38, whereby the fitting pipe portion 31 of the tilt rotation body 6 is elastically deformed and the width dimension A of the fixing notch portion 5 is reduced and, in addition thereto, the pan rotation body 4 is elastically deformed and the width dimension B of the fixing notch portion 3 is reduced. As a result, the tilt rotation body 6 is press-fitted and fixed to the outer circumferential surface of the horizontal support-shaft portion 22 of the pan rotation body 4 and, in addition thereto, the pan rotation body 4 is press-fitted and fixed to the outer circumferential surface of the vertical support-shaft portion 11 of the base body 2.

Herein, if this operation body 8 is operated to rotate by an appointed amount in the other direction, a fixation of the tilt rotation body 6 to the pan rotation body 4 and a fixation of the pan rotation body 4 to the base body 2 are released.

In addition, the attaching-object support body 7 is, as shown in FIG. 1, for example, of a quick shoe type, and has an approximately cylindrical fitting pipe portion 41 which is fitted to the outer circumferential side of the support-shaft portion 32 of the tilt rotation body 6 so as to be rotatable in the up-and-down direction.

On the upper portion of this fitting pipe portion 41, an approximately rectangular-plate-like supporting base portion 42 is provided as one body. On this supporting base portion 42, a rotating lever 43 for locking is provided. Then, to this supporting base portion 42, an attaching object such as a camera (unillustrated) is attached through one-touch operation via a quick shoe 45 with a screw 46, etc.

Now, actions, etc., of the above embodiment will be described.

In a case where the direction of the attaching object such as a camera attached to the attaching-object support body 7 of the panhead 1 is adjusted, by an operation of the operation body 8, the pan rotation body 4 is rotated with respect to the base body 2 around the vertical axis X in the left and right direction, or the tilt rotation body 6 is rotated with respect to the pan rotation body 4 around the horizontal axis Y in the up and down direction.

Then, after an adjustment of the direction of the attaching object, in a case where the tilt rotation body 6 and the pan rotation body 4 are fixed, the operating body 8 is operated to rotate in one direction.

When the operation body 8 is operated to rotate in one direction by an appointed amount, based on a tightening force due to this operation, the tilt rotation body 6 and the pan rotation body 4 are respectively elastically deformed and the width dimension A of the fixing notch portion 5 of the tilt rotation body 6 and the width dimension B of the fixing notch portion 3 of the pan rotation body 4 are respectively reduced, and as a result, the tilt rotation body 6 and the pan rotation body 4 are approximately simultaneously fixed, respectively.

At this time, since the circular portion 30 on the front-end side in the protruding direction of the pan rotation body 4 is not elastically deformed because of the existence of the blocking portion 25 and remains approximately circular plate-like, the width dimension B of the front-end side of the fixing notch portion 3 of the pan rotation body 4 is not excessively reduced.

On the other hand, by operating the operation body 8 to rotate in the other direction by an appointed amount, a fixation of the tilt rotation body 6 to the pan rotation body 4 and a fixation of the pan rotation body 4 to the base body 2 can be simultaneously released.

Herein, it is also possible to release, by an adjustment of the rotating operation amount of the operating body 8, only the fixation of the tilt rotation body 6.

In such a manner, according to the above embodiment, the tilt rotation body 6 and the pan rotation body 4 can be respectively fixed, therefore, compared to the case where two operation bodies need to be operated to rotate, operationaltiy is excellent.

In addition, since the front end of the fixing notch portion 3 of the pan rotation body 4 is blocked by the blocking portion 25 for deformation suppression, when the tilt rotation body 6 and the pan rotation body 4 are fixed, no such a case where an elastic deformation of the front-end side of the horizontal support-shaft portion 22 of the pan rotation body 4 is restricted and the width dimension B of the front-end side of the fixing notch portion 3 is excessively reduced occurs, therefore, an appropriate tilt fixing force can be obtained.

Moreover, no such inconvenience in that even if the tightening force by a rotating operation of the operation body 8 is identical, the tilt fixing force and pan fixing force are greatly changed depending on the fixing position of the tilt rotation body 6 to the horizontal support-shaft portion 22 of the pan operation body 4 occurs, therefore, irrespective of the fixing position of the tilt rotation body 6, an approximately fixed tilt fixing force and pan fixing force can be stably obtained.

Furthermore, since the blocking portion 25 of the pan rotation body 4 is provided on the horizontal support-shaft portion 22 of the main-body portion 27 of the pan rotation body 4 as one body, compared to the case where the blocking portion 25 and the main-body portion 27 are provided as separate bodies, the number of components can be reduced, the assembling work is easy, and the manufacturing cost can be reduced.

Herein, the panhead 1 is not limited to a panhead which is rotatably fitted to the outer circumferential side of the vertical support-shaft portion 11 of the base body 2, and it maybe, for example, a panhead in which the fitting pipe portion 21 of the pan rotation body 4 is rotatably fitted to the vertical support-shaft portion 11 formed on the upper-end portion of legs of a tripod or the like.

In addition, the blocking portion 25 of the pan rotation body 4 is not limited to a blocking portion which is provided in the main-body portion 27 as one body, and it may be provided as a separate body from the main-body portion 27. Namely, the blocking portion 25 may be a blocking portion which is formed by, during metallic molding of the pan rotation body 4, blocking the front end of the fixing notch portion 3, or a blocking portion which is formed by, after molding of the main-body portion 27, attaching a separate component to this main-body portion 27 and thereby blocking the front end of the fixing notch portion 3.

According to the embodiment of the invention, since the tilt operation body and the pan rotation body can be separately fixed by a rotating operation of the operation body, operationality is excellent, and since the front end of the fixing notch portion of the pan rotation body is blocked by the blocking portion for deformation suppression, the width dimension of the fixing notch portion of the pan rotation body is not excessively reduced when the tilt operation body and pan rotation body are fixed, therefore, an appropriate tilt fixing force can be obtained.

According to the embodiment of the invention, since the blocking portion is formed in the main-body portion of the pan rotation body as one body, compared to the case where the blocking portion and the main-body portion are provided as separate bodies, the number of components can be reduced and the assembling work is easy.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A panhead which comprises:
   a pan rotation body in which a fixing notch portion is formed and which rotates in the left and right direction around a vertical axis,
   a tilt rotation body which is provided on this pan rotation body, in which a fixing notch portion is formed, and which rotates in the up-and-down direction around a horizontal axis,
   an attaching-object support body which is provided on this tilt rotation body and to which an attaching object is attached, and
   an operation body which is provided so as to be rotatable on said tilt rotation body, and in which:
      by a rotating operation of said operation body, said tilt rotation body and said pan rotation body are respectively elastically deformed, the width dimension of said fixing notch portion of said tilt rotation body and the width dimension of said fixing notch portion of said pan rotation body are respectively reduced, and said tilt rotation body and said pan rotation body are respectively fixed, wherein
      the front end of said fixing notch portion of said pan rotation body is blocked by a blocking portion for deformation suppression.

2. A panhead as set forth in claim 1, wherein
the blocking portion is provided in a main-body portion of the pan rotation body as one body.

3. A panhead as set forth in claim 1, comprising
a base body having a vertical support-shaft portion; wherein:
the pan rotation body comprises;
a fitting pipe portion which is rotatably fitted to the outer circumferential side of said vertical support-shaft portion of said base body, and
a horizontal support-shaft portion in which the fixing notch portion is formed, said fixing notch portion being protruded from the fitting pipe portion toward its side, the front end of the fixing notch portion being blocked by the blocking portion, and the base end of the fixing notch portion being opened toward an internal space of the fitting pipe portion; and wherein:
the tilt rotation body comprises;
a fitting pipe portion which is rotatably fitted to the outer peripheral side of said horizontal support-shaft portion of said pan rotation body, and in which the fixing notch portion is formed, and
a support shaft portion which is protruded from the fitting pipe portion toward its rear, and to which the attaching-object support body is rotatably fitted.

4. A panhead as set forth in claim 3, wherein
the blocking portion is provided on the front-end portion of the horizontal support-shaft portion of the pan rotation body as one body.

5. A panhead as set forth in claim 4, wherein
the pan rotation body has a non-deformable circular portion which is composed of the front-end portion of the horizontal support-shaft portion and the blocking portion.

6. A panhead as set forth in claim 3, further comprising
a through hole which is linked with the fixing notch portion is formed in the fitting pipe portion of the tilt rotation body and into which the operation body is inserted.

* * * * *

UNITED STATES PATENT AND TRADEMARK OFFICE
CERTIFICATE OF CORRECTION

PATENT NO.      : 6,739,559 B2
DATED           : May 25, 2004
INVENTOR(S)     : Koichiro Nakatani It is certified that error appears in the above-identified patent and that said Letters Patent is hereby corrected as shown below:

<u>Title page,</u>
Item [75], Inventor, please delete "Shinuku-Ku" and substitute -- Shinjuku-Ku --.

Signed and Sealed this

Seventeenth Day of August, 2004

JON W. DUDAS
*Acting Director of the United States Patent and Trademark Office*